[15] 3,704,998
[45] Dec. 5, 1972

[54] WIDE ANGLE COMPACT PROJECTION LENS ASSEMBLY
[72] Inventor: John R. Miles, Glenview, Ill.
[73] Assignee: Microdisplay Systems, Inc., New York, N.Y.
[22] Filed: April 19, 1971
[21] Appl. No.: 135,071

[52] U.S. Cl. ................350/216, 350/202, 350/204, 350/220
[51] Int. Cl. .............................................G02b 9/58
[58] Field of Search.......350/202, 215, 216, 220, 203

[56] References Cited

UNITED STATES PATENTS 3,209,649  10/1965  Macher..............................350/220

FOREIGN PATENTS OR APPLICATIONS 1,545,695  10/1968  France ...............................350/203
382,193    9/1923   Germany............................350/202

*Primary Examiner*—John K. Corbin
*Attorney*—Albert F. Kronman

[57] ABSTRACT

A wide angle lens assembly is symmetrically disposed about a central space wherein a reflecting component is positioned. The lens assembly is folded into a small space by use of a right-angled total reflecting prism in the central space. The lens system has a speed of $f/4$ and a total field angle of 90°. The outer lens components are negative to obtain a wide angle of view.

1 Claim, 2 Drawing Figures

PATENTED DEC 5 1972    3,704,998
FIG. 1
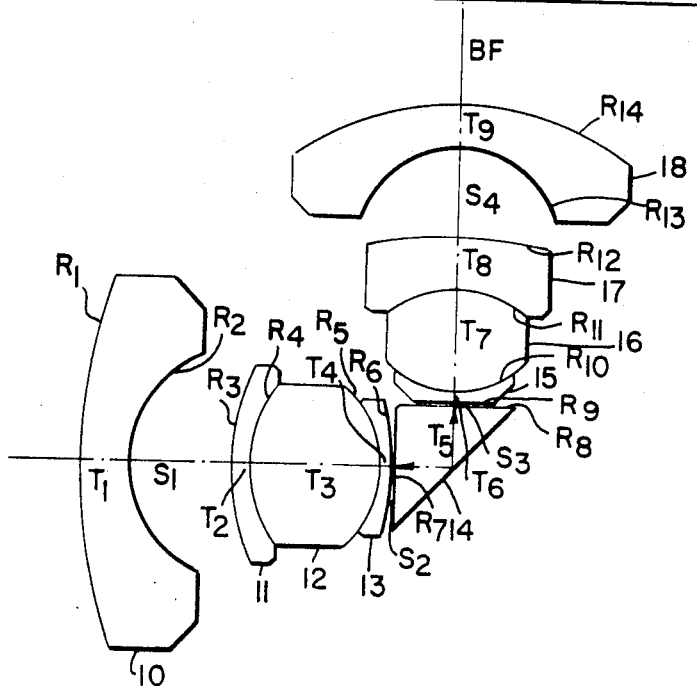
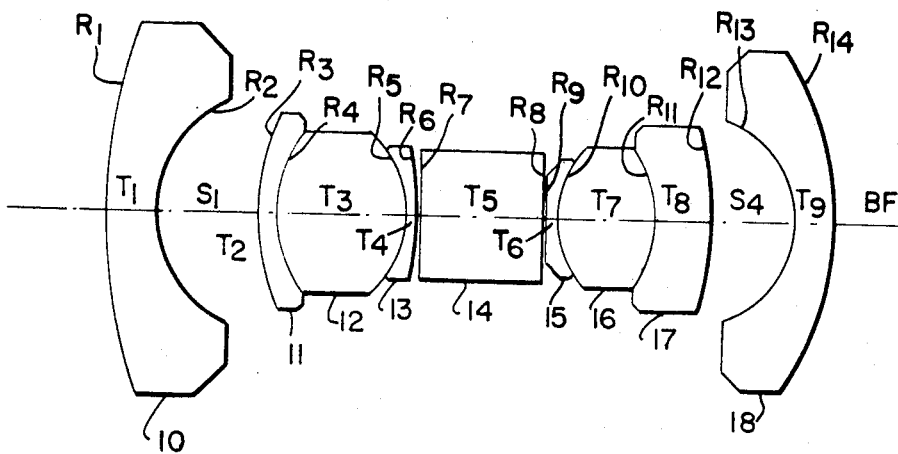
FIG. 2
INVENTOR.
JOHN R. MILES
BY
ATTORNEY

WIDE ANGLE COMPACT PROJECTION LENS ASSEMBLY

BACKGROUND OF THE INVENTION

Wide angle lenses have been used for cameras and projection systems where a large area of either an object or image is to be focused. Some prior lenses of this type have been described in U.S. Pat. Nos. 3,209,649; 2,376,091; 2,713,809; and 2,845,845. The present invention differs from the prior art by having a considerable central space wherein a total reflecting prism can be positioned. The lens system is essentially symmetrical, having two outer negative lenses and two positive lens combinations on either side of the central space. The positive lens combinations are cemented triplets with lenses of variable indices of refraction and dispersions to substantially correct for all the aberrations and produce a flat image field.

One of the features of the present invention is the use of four negative lens elements two of which are cemented to each of two spaced positive elements to correct for astigmatism when the field is flattened, and also to correct for chromatic aberration.

Another feature of the invention is the novel arrangement of lens components which produce a narrow substantially parallel bundle of rays at the center of the lens assembly where the reflecting prism or other transparent block can be positioned.

For a better understanding of the present invention, together with other details and features thereof, reference is made to the following description taken in connection with the accompanying drawings.

BRIEF DESCRIPTION OF THE FIGURES

FIG. 1 is a somewhat diagrammatic sectional view of a lens system having a right-angled total reflecting prism in the central space according to the present invention.

FIG. 2 is a sectional view of the system similar to FIG. 1 but showing a glass block at the central space and the optical axis as a straight line.

DESCRIPTION OF THE PREFERRED EMBODIMENT

Referring to the FIGURES, 10 indicates an entrance lens having a convex-concave negative configuration made of crown glass with a low index of refraction. Lens element 11 is a convex-concave negative lens separated from lens 10 by an axial space $S_1$. Lens element 11 is made of crown glass with a high index of refraction. Lens element 12 is a positive double convex lens cemented to element 11. It is made of crown glass with a medium high index of refraction. Lens element 13 is a concave-convex negative lens element cemented to lens 12, made of crown glass with a low index of refraction.

The block or reflecting prism 14 is made of flint glass with a high index of refraction to help avoid vignetting. The prism 14 is spaced a distance $S_2$ from lens 13. Lens element 15 is similar to lens 13 and is made of crown glass with a low index of refraction. It is separated from the prism 14 by a distance $S_3$. Lens element 16 is a positive double convex element of crown glass with a medium high index of refraction.

Lens element 17 is similar to element 11 but is much thicker. It is cemented to element 16 and is a concave-convex lens made of flint glass with a high index of refraction. Lens element 18 is a concave-convex lens made of flint glass having a medium low index of refraction. It is separated from lens 17 by an axial length $S_4$.

It is necessary to use positive lens elements, such as lenses 12 and 16, in an objective lens system of this type in order to obtain sufficient positive power and a short focal length. It is also necessary to use all the negative elements to correct for astigmatism, flatness of field, and chromatic aberration. Distances $S_1$ and $S_4$ are larger in order to increase the diameter of the incident light beam when it enters the positive lens elements.

Lens systems in the past have used internal prisms, but the present invention is novel in the use of an internal prism in a wide angle objective lens system, and in an objective lens system which has its two outermost elements negative in power.

The first correction for coma is made by the use of a nearly symmetrical arrangement of lens elements on the two sides of the central prism 14. The residual coma is substantially reduced to zero by the choice of glass and radius values along with lens thickness.

The spherical abberration is brought substantially to zero by the shapes and powers of all the elements, but primarily by the surfaces between elements 12 and 13, and between elements 15 and 16.

The following table gives the optical characteristics of the lens system shown in the drawing and described above. The numbers are in units, where the focal length = 100, and back focal length = 24.1.

| Lens No. | Radius (F=100) | Thickness($t$) Air Space($s$) ∞Glass | ∞Glass | Refractive Index=$N_D$ | Dispersion (V) (V) |
|---|---|---|---|---|---|
| 10 | $R_1 = 190.38$ | $t_1 = 17.54$ | C | 1.522±.005 | 59.5±2.5 |
|  | $R_2 = 41.627$ |  |  |  |  |
| 11 | $R_3 = 80.935$ | $s_1 = 36.48$ | C | 1.788±.005 | 50.5±2.5 |
|  | $R_4 = 44.987$ | $t_2 = 7.01$ |  |  |  |
| 12 | $R_5 = -37.194$ | $t_3 = 45.88$ | C | 1.592±.005 | 58.5±2.5 |
| 13 | $R_6 = -103.752$ | $t_4 = 4.91$ | C | 1.523±.005 | 51.5±2.5 |
| 14 | $R_7 = \infty$ | $s_2 = .07$ | F | 1.8±.1 | 50±15. |
|  | $R_8 = \infty$ | $t_5 = 44.55$ |  |  |  |
| 15 | $R_9 = 660.813$ | $s_3 = .07$ | C | 1.523±.005 | 51.5±2.5 |
|  | $R_{10} = 35.054$ | $t_6 = 4.21$ |  |  |  |
| 16 | $R_{11} = -42.946$ | $t_7 = 35.85$ | C | 1.658±.005 | 50.5±2.5 |
| 17 | $R_{12} = -157.627$ | $t_8 = 18.24$ | F | 1.784±.005 | 26.5±2.5 |
| 18 | $R_{13} = -37.088$ | $s_4 = 30.87$ | F | 1.541±.005 | 47.5±2.5 |
|  | $R_{14} = 103.401$ | $t_9 = 14.03$ |  |  |  | where C = Crown Glass and F = Flint Glass.

It will be noted that the two outer negative lens elements are separated from the adjacent elements by a considerable space, amounting to distances between 0.25 and 0.4 times the focal length of the system. This separation is required in order to make the optical light beam substantially larger at the positive lens elements than at the negative lens elements. The combination of the first negative element 10 plus the next positive cemented combination 11, 12, and 13 brings the incident light rays to an approximately parallel condition. This substantial parallelism of the rays provides the best location for the prism 14.

Having thus fully described the invention, what is claimed as new and desired to be secured by Letters Patent of the United States, is:

1. A wide angle projection lens constructed in accordance with the present invention comprising the lens elements as set forth in the following table:

| Lens No. | Radius F=100 | Thickness (t) air space (s) | Glass | Refractive index ($N_D$) | Dispersion (V) |
|---|---|---|---|---|---|
| 10 | $R_1 = 190.38$ | $t_1 = 17.45$ | C | 1.522±.005 | 59.5±2.5 |
|  | $R_2 = 41.627$ |  |  |  |  |
| 11 | $R_3 = 80.935$ | $s_1 = 36.48$ | C | 1.788±.005 | 50.5±2.5 |
|  | $R_4 = 44.987$ | $t_2 = 7.01$ |  |  |  |
| 12 | $R_5 = -37.194$ | $t_3 = 45.88$ | C | 1.592±.005 | 58.5±2.5 |
| 13 | $R_6 = -103.752$ | $t_4 = 4.91$ | C | 1.523±.005 | 51.5±2.5 |
| 14 | $R_7 = \infty$ | $s_2 = .07$ | F | 1.8±.1 | 50±15 |
|  | $R_8 = \infty$ | $t_5 = 44.55$ |  |  |  |
| 15 | $R_9 = 660.813$ | $s_3 = .07$ | C | 1.523±.005 | 51.5±2.5 |
|  | $R_{10} = 35.054$ | $t_6 = 4.21$ |  |  |  |
| 16 | $R_{11} = -42.946$ | $t_7 = 35.85$ | C | 1.658±.005 | 50.5±2.5 |
| 17 | $R_{12} = -157.627$ | $t_8 = 18.24$ | F | 1.784±.005 | 26.5±2.5 |
| 18 | $R_{13} = -37.088$ | $s_4 = 30.87$ | F | 1.541±.005 | 47.5±2.5 |
|  | $R_{14} = 103.401$ | $t_9 = 14.03$ |  |  |  | where C = Crown Glass and F = Flint Glass.

* * * * *